United States Patent [19]

Maezono et al.

[11] Patent Number: 4,645,051
[45] Date of Patent: Feb. 24, 1987

[54] BRAKE AND SPEED RESPONSIVE CONTROLLED TRANSMISSION

[75] Inventors: Masakazu Maezono; Takeyuki Shimizu; Keiichi Ishikawa, all of Saitama, Japan

[73] Assignee: Honda Giken Kogyo Kabushiki Kaisha, Tokyo, Japan

[21] Appl. No.: 708,348

[22] Filed: Mar. 5, 1985

[30] Foreign Application Priority Data

Mar. 6, 1984 [JP] Japan ................................. 59-41349

[51] Int. Cl.[4] ............................................. B60K 41/28
[52] U.S. Cl. ............................. 192/0.055; 192/0.094; 192/4 A
[58] Field of Search ............... 192/0.076, 0.055, 0.032, 192/0.094, 4 A, 3.22; 74/846, 878, 867, 868, 869, 866

[56] References Cited

U.S. PATENT DOCUMENTS

| 4,181,204 | 1/1980 | Ito ........................................ 192/4 A |
| 4,290,513 | 9/1981 | Nishimura et al. ................. 192/3.22 |
| 4,478,108 | 10/1984 | Nishimura et al. .................... 74/866 |
| 4,513,639 | 4/1985 | Hiramatsu ......................... 74/867 X |

Primary Examiner—George H. Krizmanich
Attorney, Agent, or Firm—Lyon & Lyon

[57] ABSTRACT

An apparatus for controlling a multi-speed, oil pressure operated type vehicle transmission connected to an engine through a torque converter wherein each drive train includes an oil pressure operated clutch and the low speed drive train also includes a one-way clutch engagement element, such as an oil pressure clutch or the like, interposed in each of said driving trains such that each driving train is established by oil supply to each said clutch. The apparatus includes a holding device for the highest speed drive train which is actuated when the brake operation is detected and the vehicle is stopped, which actuation provides a pressurized oil supply to the highest speed oil pressure operated clutch interposed in said high speed drive train to minimized the torque transmitted from the engine even though the pressurized oil is continuously supplied to the low speed oil pressure clutch interposed in said low speed driving train.

7 Claims, 2 Drawing Figures

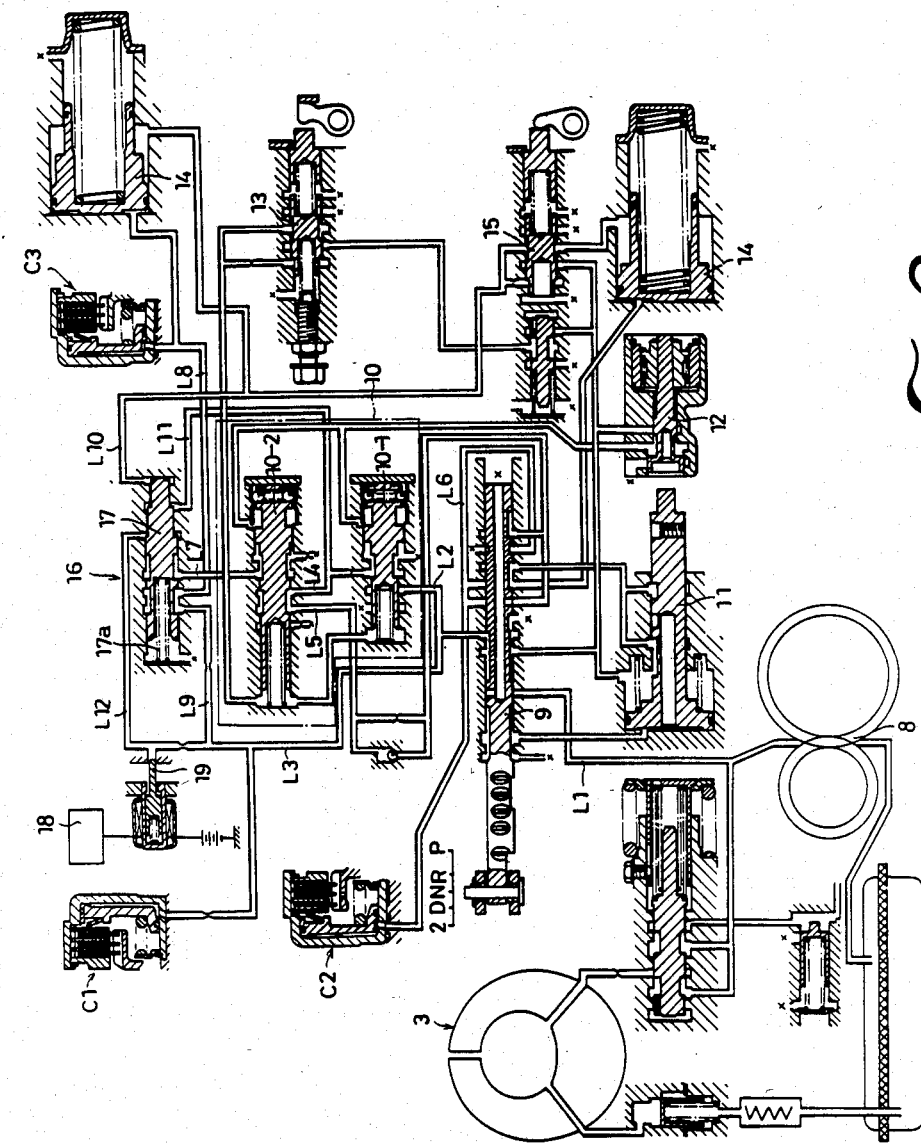

BRAKE AND SPEED RESPONSIVE CONTROLLED TRANSMISSION

The present invention relates to an apparatus for controlling an oil pressure operated type transmission for a vehicle having a transmission connected to an engine through a torque converter with at least two drive trains of a low speed and a high speed, and an oil pressure clutch or the like interposed in each of the drive trains such that each drive train is established by oil supply to the corresponding clutch.

Transmissions of this type, such as shown in U.S. Pat. No. 4,290,513, are well known which include a one-way clutch interposed in the low speed driving train so as to allow over-rotation on the output side, whereby the high speed driving train can be established even while the pressurized oil is supplied to the low speed oil pressure clutch in the low speed driving train. However, in a vehicle equipped with this type of transmission, if the brake is actuated in order to stop the vehicle, as for example while waiting for a traffic light, the engine torque increased by the torque converter and the low speed driving train is transmitted to the output side of the transmission and the reaction force is transmitted to the vehicle body through the brake and the driving system. Since the engine torque fluctuates, this type of transmission usually causes body vibration known as "idling vibration".

One attempt to overcome such disadvantage has been to provide a control means which operates when brake operation is detected and the vehicle is at a stop to cut off the oil supply to the low speed oil pressure clutch, thereby automatically shifting the transmission into a neutral state. This type of control has the disadvantage that when the accelerator pedal is pressed to start the vehicle in motion immediately after releasing the brake, the neutral state continues temporarily due to a time lag between the time the oil supply to the low speed oil pressure clutch is resumed by the cancellation of the operation of the control means and the time the low speed driving train is actually established. As a consequence, the engine speed may be allowed to suddenly increase and then the vehicle will suddenly start moving by the establishment of the driving train at a high engine speed. Moreover, under such conditions if the vehicle is on an upward slope it may move backward temporarily as a result of the low speed drive train being disengaged for a moment following brake release.

Accordingly, a primary object of the present invention is to provide an apparatus which makes it possible to reduce the vehicle body vibration without giving rise to the above-described disadvantages. To this end, the present invention provides an apparatus for controlling an oil pressure operated type vehicle transmission with a torque converter that has at least two drive trains, that is, a high speed drive train and a low speed drive train including a one-way clutch, and an oil pressure type engagement element or the like interposed in each of the drive trains such that each driving train is established by oil supply to the corresponding engagement element, the apparatus comprising a high speed drive train holding device which is actuated when a brake operation is detected and the vehicle is at a stop, wherein the pressurized clutch oil is supplied to the high speed oil pressure clutch in the high speed drive train when the holding device is actuated to engage the high speed drive train even though the pressurized oil also is continuously supplied to the low speed oil pressure clutch in the low speed driving train. It is an object of this invention to provide means for controlling a multi-speed, oil pressure operated vehicle transmission with a torque converter to minimize body vibration while stopped with the brake applied by detecting that condition and causing the high speed drive train to be engaged to minimize the torque being transmitted without disengaging the low speed drive train for allowing immediate acceleration.

The present invention will be described herein in connection with a preferred embodiment by reference to the accompanying drawings, wherein:

FIG. 2 is a diagrammatic illustration of the transmission control system of this invention.

Figure 1:
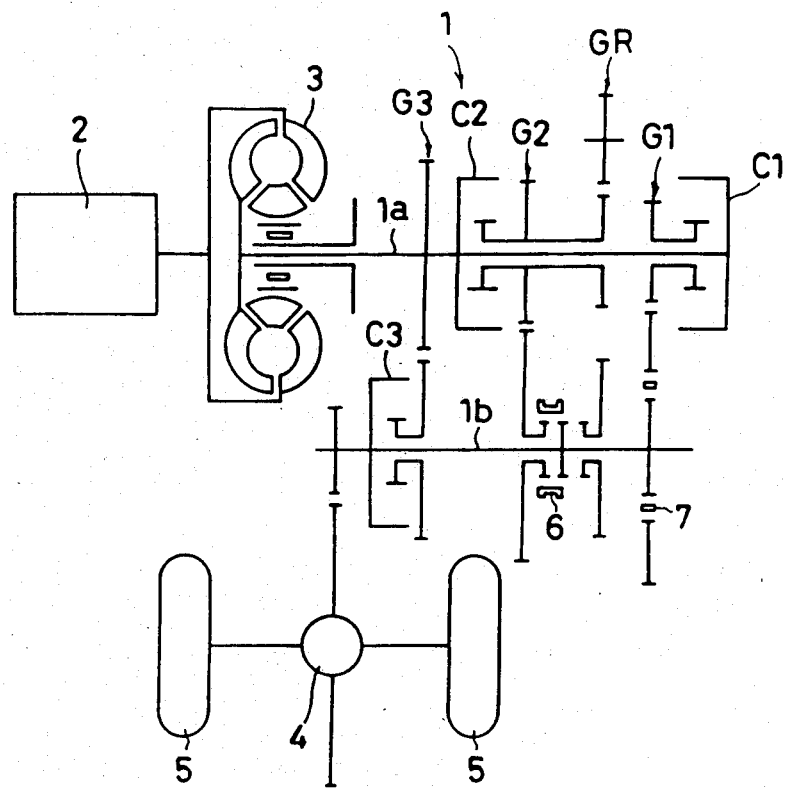
FIG. 1 is a diagram of one example of the vehicle and transmission to which the present invention is applicable.

Referring first to FIG. 1, a transmission, generally designated 1, is connected to an engine 2 through a torque converter 3. The output from the transmission 1 is transmitted to driving wheels 5 of a vehicle through a differential gear 4. The transmission 1 has an input shaft 1a connected to the torque converter 3 and an output shaft 1b connected to the differential gear 4. Between the input and output shafts 1a, 1b are provided first to third speed driving trains G1, G2, G3 for forward running and a reverse driving train GR. First to third speed oil pressure clutches C1, C2, C3 are respectively interposed in the driving trains G1, G2, G3 for forward running such that the driving trains G1, G2, G3 are established when the oil pressure clutches C1, C2, C3 are engaged by the oil supply thereto.

The reverse driving train GR uses the second speed oil pressure clutch C2 in common with the second speed driving train G2. A selector gear 6 is provided which selectively connects the driving trains GR, G2 to the output shaft 1b. When the gear 6 is changed over to the reverse side, which is the right-hand side as viewed in FIG. 1, the reverse driving train GR is established.

A one-way clutch is interposed in the first speed driving train G1 and operates to allow over-rotation of the output shaft 1b side when one of the higher speed gear trains is established.

The supply and discharge of oil in relation to the oil pressure clutches C1, C2, C3 are controlled by, for example, an oil pressure circuit such as that shown in FIG. 2. The oil pressure circuit includes: an oil pressure source 8; a manual valve 9 which can be changed over between five positions, that is, a position "P" for parking, a position "R" for reverse running, a position "N" for neutral, a position "D" for automatic shift, and a position "2" for holding the second speed; a shift valve 10 which is changed over in accordance with the vehicle speed and the throttle degree; and a servo valve 11 for changing between forward running and reverse running by properly disconnecting and connecting, respectively, the above-described selector gear 6. When the manual valve 9 is at the position "D", a first oil passage L1 for oil supply connecting to the oil pressure source 8 is connected to a second oil passage L2 connecting to the shift valve 10, whereby oil is supplied to the first speed oil pressure clutch C1 through a third oil passage L3 branched off from the second oil passage L2 and is also supplied to the second and third speed oil pressure clutches C2, C3 through oil passage controlled by the shift valve 10. In this case, the shift valve 10 is composed of a first shift valve 10-1 for making a speed change between the first and second speeds which is disposed on the upstream side and a second shift valve 10-2 for making a speed change between the second and third speeds which is disposed on the downstream side, the first and second shift valves 10-1, 10-2 being interconnected through an intermediate fourth oil passage L4. The valves 10-1, 10-2 are so arranged as to have applied at their respective one ends, namely, at the right ends, with a governor pressure corresponding to the vehicle speed from a governor valve 12 and at their respective left ends with a throttle pressure corresponding to a throttle opening degree from a first throttle valve 13. As the vehicle speed increases, first, the first shift valve 10-1 is moved from the first speed position on its right-hand side to the second speed position on its left-hand side, whereby the second oil passage L2 is connected through the fourth oil passage L4 to a fifth oil passage L5 on the outlet side of the second shift valve 10-2. As a consequence, oil is supplied to the second speed oil pressure clutch C2 through a sixth oil passage L2 which is connected to the fifth oil passage L5 when the manual valve 9 is at the position "D", thereby allowing the second speed drive train G2 to be established. As the vehicle speed further increases, the second shift valve 10-2 is moved from the second speed position on its right-hand side to the third speed position on its left-hand side, whereby the fourth oil passage L4 is switched from the fifth oil passage L5 to a seventh oil passage L7. In consequence, oil is supplied to the third speed oil pressure clutch C3 through an eighth oil passage L8 which is connected to the seventh oil passage L7 through a control valve 17, described later, thereby allowing the third speed drive train G3 to be established.

It is to be noted that, when the manual valve 9 is at the position "D", oil is constantly supplied to the first speed oil pressure clutch C1 through the third oil passage L3 as described above, but the effective operation of the first speed drive train G1 is cancelled by the operation of the one-way clutch 7 when either one of the second or third speed drive trains G2, G3 is established.

In FIG. 2, the reference numeral 14 denotes an accumulator for buffering the pressure applied to the second and third speed oil pressure clutches C2, C3, while the numeral 15 represents a second throttle valve which regulates the back pressure relative to the accumulator 14 in accordance with the throttle degree.

According to the present invention, a high speed drive train holding device, generally designated 16, is provided which is actuated when brake operation is detected and the vehicle is stopped. When the device 16 is actuated, oil is supplied to the third speed oil pressure clutch C3 interposed in the third speed drive train G3 as the highest speed drive train, and oil is continuously supplied to the first speed oil pressure clutch C1 interposed in the first speed drive train G1 as the lowest speed drive train even when the device 16 is in an operative state.

The illustrated device 16 is arranged such as to be operative when the manual valve 9 is at the position "D". Through the control valve 17, as an element of the device 16, the eighth oil passage L8 connected to the third speed oil pressure clutch C3 is allowed to be switched, as desired, between the seventh oil passage L7 and a ninth oil passage L9 branched off from the third oil passage L3. The control valve 17 is urged by a spring 17a to the illustrated operative position where the control valve 17 allows the eighth oil passage L8 to be connected to the ninth oil passage L9. The control valve 17 is further urged from its inoperative position, i.e. its left-hand side as viewed in FIG. 2, where the control valve 17 allows the eighth oil passage L8 to be connected to the seventh oil passage L7, by means of the following oil pressures: a throttle-responsive oil pressure corresponding to an engine throttle degree of opening which is input from the second throttle valve 15 through a tenth oil passage L10; an oil pressure which is input through an eleventh oil passage L11 branched off from the fourth oil passage L4 when the first shift valve 10-1 is changed over to the second speed position; and an oil pressure which is input through a twelfth oil passage L12 branched off from the third oil passage L3. The device 16 is further provided in the twelfth oil passage L12 with an electromagnetically operated type air leak valve 19 which is opened when the brake is operated by means of a signal from a brake sensor 18. The control valve 17 is constructed and adjusted by a proper setting of spring 17a to be shifted from its inoperative position to its operative position only when all the following three conditions are satisfied:

(1) when the throttle opening degree is below a predetermined value, and consequently the throttle-responsive oil pressure input through the tenth oil passage L10 is below a predetermined value;

(2) when the first shift valve 10-1 is at the first speed position, and consequently no oil pressure is input from the eleventh oil passage L11; and (3) when the brake is in an operative state, and no oil pressure is input from the twelfth oil passage L12 due to the fact that the air leak valve 19 is open.

Further, the brake sensor 18 is arranged such as to open the air leak valve 19 when either the foot brake or the hand (parking) brake is in an operative state by detecting, for example, the stroke of the brake pedal of the foot brake and the stroke of the brake lever of the hand brake.

In operation, when the vehicle is running in a normal state such as during acceleration, deceleration or cruising without operating the brake, the control valve 17 is held at its inoperative position by the oil pressure which is input through the twelfth oil passage L12. As a consequence, the seventh oil passage L7 and the eighth oil passage L8 are interconnected, whereby the first to third speed drive trains G1, G2, G3 are successively and selectively established in a conventional manner in response to the changeover operation of the shift valve 10 in accordance with the vehicle speed and the throttle opening degree. When the vehicle is decelerated by operating the brake, the oil pressure input from the twelfth oil passage L12 is cut off. For instance, in the case where the vehicle is in the third speed running state wherein the third speed drive train G3 is established and is decelerated by operating the brake until the vehicle comes to a stop, first, with deceleration the second shift valve 10-2 is changed over to the second speed position, whereby shift-down from the third speed to the second speed is effected. Then as the speed decreases further the first shift valve 10-1 is changed over to the first speed position, whereby a shift-down from the second speed to the first speed is effected. Thus, the oil pressure input through the eleventh oil passage L11 is also cut off. In this case, since the accelerator pedal has been released and consequently the throttle-responsive oil pressure input through the tenth oil passage L10 is below a predetermined value, all the above-described three conditions are satisfied. Consequently, the control valve 17 is shifted to its operative position, whereby oil is supplied to the third speed oil pressure clutch C3 from the third oil passage L3 through the ninth oil passage L9 and the eighth oil passage L8, thereby allowing the third speed drive train G3 to be established. The vehicle is decelerated until it comes to a established state even when the vehicle is at a stop with the brake being operated such as while waiting for a traffic signal.

It is to be noted that the first speed oil pressure clutch C1 is continuously supplied with oil even when the control valve 17 is shifted to its operative position, that is, when the high speed drive train holding device 16 is in an operative state. Accordingly, at the same time the control valve 17 is shifted to its inoperative position by releasing the brake and consequently the third speed drive train G3 is disengaged by the discharge of oil from the third speed oil pressure clutch C3 through the eighth and seventh oil passages L8, L7, the first speed drive train G1 has continuously been established, although overrun through one way clutch 7, thus enabling the vehicle to be accelerated immediately by the first speed drive train G1.

It is to be noted that the above-described embodiment is arranged such that, even when the brake is being operated while the vehicle is stopped, if the throttle opening degree becomes higher than a predetermined value, the control valve 17 is changed over to its inoperative position by the throttle-responsive oil pressure which is input through the tenth oil passage L10 so as to establish the first speed drive train G1 and therefore the starting properties of the vehicle on a slope are further improved.

Moreover, although the above-described embodiment is arranged such that the control valve 17 is supplied with the oil pressure in relation to the first shift valve 10-1 from the fourth oil passage L4 through the eleventh oil passage L11, in place of the above-described oil pressure, a governor pressure corresponding to the vehicle speed may be input to the control valve 17 from the governor valve 12 such that control valve 17 is changed over to its operative position when the vehicle speed becomes lower than a predetermined value while the vehicle is being decelerated by operating the brake.

Further, the present invention is applicable to transmissions which employ oil pressure engagement elements other than oil pressure clutches, for example, oil pressure brakes, such as a transmission which employs a planetary gear mechanism. Furthermore, the present invention is also applicable to transmissions thereby having four or five speed forward changes and with transmissions the pressurized oil is supplied to the highest speed oil pressure clutch or oil pressure engagement element for establishing that drive train while stopped with the brake applied.

As has been described above, according to the present invention, the high speed drive train is established by the high speed drive train holding device which is actuated when a brake operation is detected and the vehicle is stopped. Thus, the torque transmitted from the engine side to the driving wheel side is smaller than that which occurs when the low speed driving train is established, and therefore the torque fluctuation accompanying the transmitted torque also is smaller, thereby allowing the idling vibration to be reduced. Further, the arrangement is such that, even when the above-described device is in an operative state, oil is continuously supplied to the low speed oil pressure engagement element for the low speed driving train. Therefore, when the vehicle is accelerated from the stopped condition, the low speed drive train is established at the same time the high speed drive train is disengaged by cancellation of the operation of the holding device, so that the transmission is not shifted into a neutral state during the shift from the high speed state to the low speed state. Accordingly, it is advantageously possible to accelerate the vehicle smoothly without any of the prior art problems, such as a sudden increase in the engine speed or backward rolling on a slope.

The invention claimed is:

1. A control apparatus for multi-speed, oil pressure operated vehicle transmission having an oil pressure operated clutch for each speed drive train, a lowest and a highest speed drive train, and a one-way clutch in the lowest speed drive train, comprising, means for detecting a brake actuated condition and a stopped condition of the vehicle including means responsive to the throttle opening and governor of the vehicle engine, and means responsive to said detecting means for supplying oil pressure to the clutch for the highest speed drive train during the continuance of either said brake actuated or stopped vehicle condition for minimizing the torque transmitted through the transmission.

2. The control apparatus of claim 1 wherein said defecting means includes brake sensor means.

3. The control apparatus of claim 1 wherein said detecting means includes means responsive to the throttle opening of the vehicle engine for detecting the stopped condition of the vehicle.

4. The control apparatus of claim 1 wherein said detecting means includes means responsive to the governor of the vehicle engine for detecting the stopped condition of the vehicle.

5. A control apparatus for a multi-speed, oil pressure operated vehicle engine transmission having oil pressure engagement elements for each speed drive train and a lowest and highest speed drive train, comprising, means for continually supplying oil pressure to the lowest speed drive train engagement element for continuous engagement thereof during normal forward operation of the vehicle, a one-way clutch in said lowest speed drive train for allowing overrunning thereof during engagement of the higher forward speed drive train, and control means for supplying oil pressure to the engagement element of the higher speed drive train, said control means including means for detecting a brake-actuated condition and stopped condition of the vehicle in response to a throttle opening and governor means of the vehicle engine, for reducing the torque transmitted through the transmission in either of said conditions.

6. The control apparatus of claim 5 wherein said control means includes means for detecting actuation of the vehicle brake and low speed operation of the vehicle engine for determining said conditions.

7. An apparatus for controlling an oil pressure operated type transmission for a vehicle which transmission is connected to an engine through a torque converter and has at least a high speed drive train and a low speed drive train, each of which includes an oil pressure engagement element, such that each drive train is established by oil supply to each of said engagement elements and the low speed drive train includes a one-way clutch, said apparatus comprising, a high speed drive train holding device, said holding device being actuated when a brake operation is detected and the vehicle is stopped, means responsive to the throttle opening of the vehicle engine for detecting said stopped condition of the vehicle, and means responsive to the governor of the vehicle engine for detecting said stopped condition of the vehicle, wherein oil pressure is supplied to the high speed driving train when said device is actuated, and oil pressure is continuously supplied to the low speed oil pressure engagement element interposed in said low speed driving train.

* * * * *